US005328218A

United States Patent [19]

Brusasco et al.

[11] Patent Number: 5,328,218

[45] Date of Patent: Jul. 12, 1994

[54] ELECTRIC LOCK ACTUATOR DEVICE

[75] Inventors: Enzo Brusasco, Torin; Giuseppe Boero, Candiolo, both of Italy

[73] Assignee: Roltra-Morse, S.P.A., Cascine Vica-Rivoli, Italy

[21] Appl. No.: 752,483

[22] PCT Filed: Mar. 6, 1990

[86] PCT No.: PCT/IT90/00020

§ 371 Date: Sep. 9, 1991

§ 102(e) Date: Sep. 9, 1991

[87] PCT Pub. No.: WO90/10774

PCT Pub. Date: Sep. 20, 1990

[30] Foreign Application Priority Data

Mar. 7, 1989 [IT] Italy ................................ 52923-9[U]

[51] Int. Cl.[5] ........................ E05C 21/00; F16H 57/02

[52] U.S. Cl. .................................. 292/201; 292/336.3

[58] Field of Search ...................... 292/144, 201, 336.3; 70/137; 74/89.15, 89.17, 625, 405, 406

[56] References Cited

U.S. PATENT DOCUMENTS 4,106,359 8/1978 Wolfe et al. .................... 74/89.15 X
4,654,522 3/1987 Gornick et al. .............. 250/231 SE
4,679,451 7/1987 Nakamura ................... 74/424.8 RX
4,729,544 3/1988 Baumann ...................... 74/89.15 X
5,072,973 12/1991 Gudgel et al. .................. 292/201 X
5,086,900 2/1992 Kikuta et al. .................. 74/89.15 X
5,129,273 7/1992 Fukui et al. ........................ 74/89.15

FOREIGN PATENT DOCUMENTS 2211093 3/1972 Fed. Rep. of Germany .
2940673 1/1979 Fed. Rep. of Germany .

*Primary Examiner*—Richard E. Moore

[57] ABSTRACT

An electric lock actuator device (201), in particular for motor vehicles, comprising an electric motor (204) driving a recirculating ball worm screw unit (251, 260) for rectilinear movement of a cap element (264) slidable on a portion (207) of the frame (202) housing the motor (204) and adapted to act on a member (267) for locking and releasing the operation of a lock, and including a specific electronic control unit (27) for this electric motor (204), in which this electronic unit (27) includes a first integrated circuit (23) for distribution of electrical power supply for operation of the electric motor (204), and a second integrated circuit (25) for dealing with information signals relating to the operation of the motor (204), these integrated circuits (23, 25) being connected to a printed circuit (271) which is already utilised by slidable contact blades (270) having an end-of-stroke commutation function, fixed to the movement of this slidable cap (264), and which is housed in a portion (220) of the frame (202) of the device (201), which is integral with the portion (207) of the frame (202) housing the electric motor (204).

11 Claims, 2 Drawing Sheets

ELECTRIC LOCK ACTUATOR DEVICE

TECHNICAL FIELD

The present invention relates to an electric lock actuator device, and in particular to such a device of the type in which a DC electric motor drives, in a known way, by means of a recirculating ball worm screw unit, the rectilinear movement of an element displaceable with respect to the frame of the device, and a displacement actuator for a member for locking and releasing the lock, conveniently this member can act to restrain or release a lock opening actuation lever which can be a door lock, a boot lock or a fuel filler closure flap of a vehicle.

BACKGROUND ART

As is known, currently for the drive and control of such actuator devices fitted on motor vehicles, use is made in practice of a wiring system dedicated to electrical supply for the motor, which leads from a common central control unit for various actuator devices, which include relay units, limiter circuits etc. This wiring system involves various disadvantages, including: the complexity and difficulty of fitting bundles of wires, the high number of electrical connections, the difficulty of identification in the case of breakdowns, and the complexity of testing the operation of the system during and/or after assembly on the vehicle.

From EP-A-77 254 and FR-A-2 600 366 electric lock actuator devices are known, comprising an electric motor and a displacement actuator element displaceable with respect to a frame of said device under the action of said motor, for locking and releasing a lock in a vehicle, including a specific electronic unit for controlling said electric motor, said electronic unit comprising a plurality of components connected to a printed circuit and housed in a portion of said frame which is integral with a portion of the frame housing said electric motor.

In said EP document, the frame has a substantially parallelepipedal flat shape, with the printed circuit housed parallel to the bigger bases of the frame and fixed thereto by virtue of screws. This arrangement is disadvantageous since the resulting lock actuator is bulky and securing of the printed circuit requires additional operations involving manufacturing costs. In said FR document, on the contrary, no indication is given on the exact arrangement of the printed circuit within the frame, whereas the electronic unit accommodated on the printed circuit only comprises a pair of diodes.

DISCLOSURE OF THE INVENTION

The object of the present invention is to provide an actuator device of the general type disclosed in said EP and FR documents, designed to overcome the above drawbacks, i.e. which is very simple to produce and to assemble, has a small bulk and is also suitable for a drive and control system of the type described in Italian Patent application entitled "A drive and control system for a plurality of electrical devices in a vehicle" filed on th same date and corresponding to International Patent Application PCT/IT90/00023.

According to the present invention, there is provided an electric lock actuator device of the general type disclosed in said EP and FR documents, which is characterized in that said frame has a pair of mutually facing grooves formed therein and in that said printed circuit has its lateral edges engaged within said facing grooves.

BRIEF DESCRIPTION OF DRAWINGS

For a better understanding of the present invention a particular embodiment thereof will now be described, by way of non-limitative example, with reference to the attached drawings, in which.

BEST MODE FOR CARRYING OUT THE INVENTION

Figure 1:
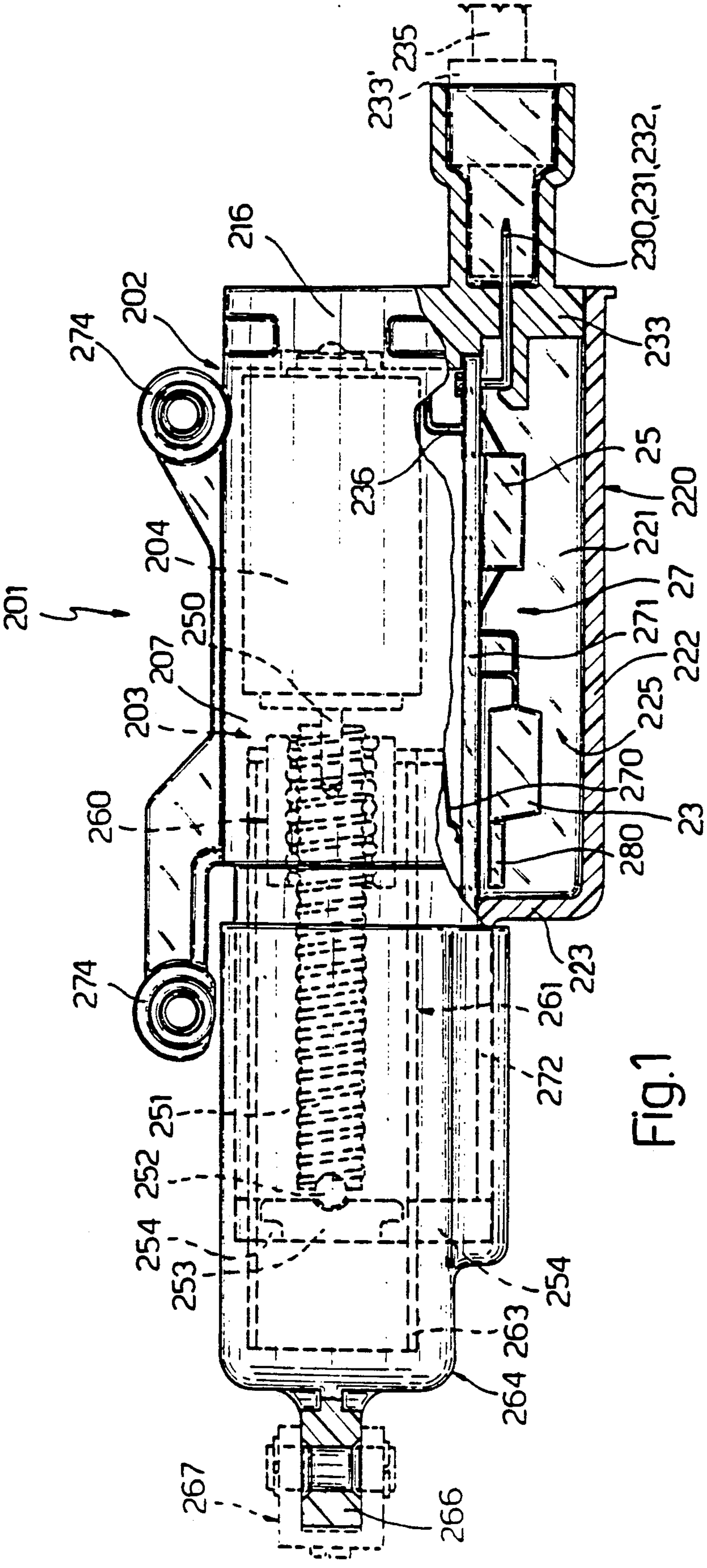
FIG. 1 is a partially sectioned side view of an electric lock actuator device formed according to the principles of the present invention.

With reference to FIG. 1, the reference numeral 201 generally indicates an electric lock actuator device which includes, in a substantially known way, a main frame 202 in the form of a shaped container, conveniently made of plastics material, having a substantially tubular main portion 207 with flattened diametral sections which form an internal through cavity 203 in a first section of which is housed a DC electric motor 204 which has a drive spindle 250 which is secured both angularly and axially to one end of a worm screw 251 which at its other end axially contacts against a ball 252 which in turn is housed in a central hub portion 253 which is supported by radial arm portions 254 at the end of the tubular portion 207 opposite the housing zone of the motor 204. The other axial end of the motor 204, opposite the drive spindle 250 is engaged and centred on an external closure plug 216 of the cavity 203, which has a form similar to that of the tubular portion 207, is conveniently made of plastics material, and is fixed at the extreme edge of the cavity 203 by cooperating coupling portions which are conveniently snap-engageable.

On the screw 251 is engaged a nut 260 by means of a recirculating ball unit which is secured to a tubular body 261 housed slidably, but without the possibility of rotating, within the cavity 203, and projects from this through the radial arm portions 254 with an end part 263 which is fixed within a tubular cap body 264 which is slidably disposed over a part, of corresponding section, of the tubular portion 207. This cap body 264 has at one end a pierced portion 266 in which a member 267, indicated in broken outline, can be connected in a known manner, which is able to act for locking and release of a lock.

At the end of the tubular body 261, outside the cap body 264, there is fixed a pair of electrical blade contact elements 270 which are able to slide on respective tracks formed on the upper face of a printed circuit board 271 which is housed in the cavity 203 beneath the motor 204, and engages with a terminal portion of a flattened portion 272 of the tubular portion 207. These electrical contact elements 270 are able to perform, in a known way, an electrical commutation function at the end of the displacement stroke of the tubular body 261 and therefore of the cap body 264.

The frame 202 further has two upper pierced portions 274 for connection of the frame 202 itself to a convenient support.

According to the present invention, this frame 202 has, beneath a first section of the tubular portion 207, an integral portion 220 with two parallel side walls 221, a base wall 222 and an end wall 223 which form a second cavity 225 underlying the cavity 203 and the longitudinal axis of which is parallel to the longitudinal axis of the cavity 203 itself.

Figure 2:
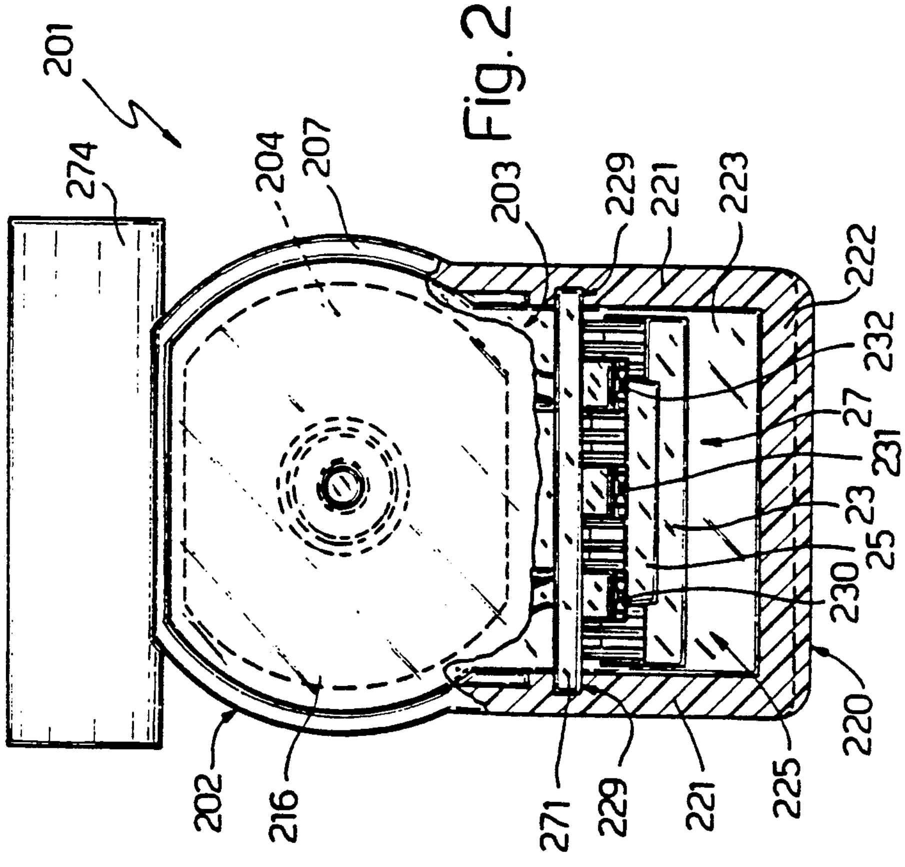
FIG. 2 is a partially sectioned front view of the actuator device of FIG. 1.

Within this cavity 225 is housed an electronic unit 27 for control and drive of the electric motor 204, according to the system described in the said Italian Patent application entitled "Control and Drive System for a Plurality of Electrical Devices in a Motor Vehicle". In particular, this unit 27 is connected to the already existing printed circuit board 271 which is for this reason disposed with its lateral edges engaged within respective grooves 229 formed towards the upper zone of the side walls 221 (FIG. 2) where they join the tubular portion 207.

To the lower face of the printed circuit 271 are connected:

three electrical contact elements 230, 231 and 232, conveniently of the blade type, which are housed in an insulating plug connector 233 which is made integrally with the plug 216 for external closure of the cavity 203, and shaped in such a way as to effect substantially sealed closure of the end opening of the cavity 225 opposite the end wall 223; this connector 233 is adapted to be coupled with a corresponding connector block 233' (illustrated in broken outline) connected to the end of an electrical cable 235 having three electrical conductors the first of which is a positive electrical power supply line, the second of which is an information signal transmission line, and the third of which is an earth connection line. This electrical cable 235 conveniently extends from a main central control unit comprising a microprocessor to this device 201 conveniently disposed in a vehicle door;

a first integrated circuit 23, provided with a dissipator 280 for distribution of the electrical power supply to the motor 204 by means of associated electrical wires 236, and a second integrated circuit 25 for the processing of information signals relating to the operation of this motor 204. These integrated circuits 23 and 25 can conveniently include specific logic circuits or a microprocessor, solid state switches etc, and can include excess current and excess voltage protection circuits, diagnostic and monitoring circuits etc, also in combination with other discrete circuit components, all connected to the printed circuit 271.

INDUSTRIAL APPLICABILITY

The advantages obtained with the actuator device of the present invention are evident from what has been described in that, thanks to the electronic unit 27, which makes it possible to process information signals relating to the operation of the device 201 itself and to control the distribution of the electrical power supply for operation of the motor 205, significantly simplifies the assembly and reliability of the drive and control system by the significant reduction in the number of connection wires as well as the associated connections; moreover this electronic unit 27 makes it possible to have a malfunction diagnostic function both for a greater safety in operation of the vehicle, in that possible anomalies can be indicated in good time to the driver, and for a reduction in repair times in that it can give the repair engineer an indication of the type of anomaly. All this translates obviously into a simplification of testing both in the assembly line and at the end of the assembly line. The provision of a specific electronic unit 27 for this device 201 also makes it possible to vary the type of operation of the device itself, with the simple modification of the particular electronic unit and the programme resident in the central unit. The housing of this electronic unit 27 is further achieved in an economic manner with a simple modification of the conventional frame, by the integral portion 220 which does not substantially alter the most critical dimensions of the device 201 which, therefore, can still be housed in the door in the usual position. Such a frame 202 could therefore also be provided for devices 201 whether or not they have the electronic unit 27. The connector unit 233, as well as being integral with the conventional plug 216, further constitutes the closure and protection element for the electronic unit 27.

We claim:

1. An electric lock actuator device (201) comprising an electric motor (204) and a displacement actuator element (264) displaceable with respect to a frame (202) of said device under the action of said motor (204), for locking and releasing a lock in a vehicle, including a specific electronic unit (27) for controlling said electric motor (204), said electronic unit (27) comprising a plurality of components (23, 25) connected to a printed circuit (271) and housed in a portion (220) of said frame (202) which is integral with a portion (207) of the frame (202) housing said electric motor (204), characterized in that said frame (202) has a pair of mutually facing grooves (229) formed therein and in that said printed circuit (271) has its lateral edges engaged within said facing grooves (229); wherein said portion (220) of the frame (202) housing said electronic unit (27) is laterally adjacent to said portion (207) of the frame housing said electric motor (204) and is separated therefrom by said printed circuit (271); and wherein said printed circuit (271) has a first face looking toward said portion (207) housing said electric motor (204), said first face carrying means (270) to determine variation of at least one electrical signal in dependence on at least one limit position of said displacement actuator element (264), and a second opposite face looking toward said portion (220) housing said electronic unit (27), said second opposite face carrying said components (23, 25).

2. A device according to claim 1, characterized in that said portions (220, 207) of the frame (202) housing said electronic unit (27) and said motor (204) define mutually parallel, main longitudinal axes, said grooves (229) extending parallel to said main longitudinal axes in opposite side walls (221) of said frame (202).

3. A device according to claim 1, characterized in that said means operable to determine variation of at least one electrical signal comprises at least one electrical contact element (270) slidable on said first face of said printed circuit (271) and secured to a portion (261) fixed to said displacement actuator element (264).

4. A device according to any one of claims 1 or 2, characterized by a closure cap (216) closing said portion (207) of the frame (202) housing said electric motor (204), said closure cap (216) being integral with a three element connector (233) externally closing said portion (220) of the frame (202) housing said electronic unit (27), said connector (233) including a first power level positive electrical supply lead, a second information signal transmission lead and a third earth connection lead for connection to an electrical connection cable (235).

5. A device according to any one of claims 1 or 2, characterized in that said displacement actuator element (264) for locking and releasing said lock is slidable along said frame (202) housing said motor (204) and is secured to a body (261) displaceable under the action of said motor (204) via a recirculating ball worm screw unit (251, 260).

6. A device according to any one of claims 1 or 2, characterized in that said electronic unit (27) includes at least one first integrated circuit (23) for distribution of the electrical power supply for operation of said electric motor (204), and at least a second integrated circuit (25) for dealing with information signals relating to the operation of said motor (204).

7. A device according to any one of claims 1 or 2, characterized in that said specific electronic control unit (27) includes diagnostic and/or indication means for possible breakdowns of said device (201).

8. A device according to any one of claims 1 or 2, characterized in that it is applied to a vehicle door lock.

9. An electric lock actuator device (201) comprising an electric motor (204) and a displacement actuator element (264) displaceable with respect to a frame (202) of said device under the action of said motor (204), for locking and releasing a lock in a vehicle, including a specific electronic unit (27) for controlling said electric motor (204), said electronic unit (27) comprising a plurality of components (23, 25) connected to a printed circuit (271) and housed in a portion (220) of said frame (202) which is integral with a portion (207) of the frame (202) housing said electric motor (204), characterized in that said frame (202) has a pair of mutually facing grooves (220) formed therein and in that said printed circuit (271) has its lateral edges engaged within said facing grooves (229); comprising a closure cap (216) closing said portion (207) of the frame (202) housing said electric motor (204), said closure cap (216) being integral with a three element connector (233) externally closing said portion (220) of the frame (202) housing said electronic unit (27), said connector (233) including a first power level positive electrical supply lead, a second information signal transmission lead and a third ground connection lead for connection to an electrical connection cable (235).

10. A device according to claim 9, wherein said portion (220) of the frame (202) housing said electronic unit (27) is laterally adjacent to said portion (207) of the frame housing said electric motor (204) and is separated therefrom by said printed circuit (271).

11. A device according to claim 9, wherein said portions (220) of the frame (202, 207) housing said electronic unit (27) and said motor (204) define mutually parallel, main longitudinal axes, said grooves (229) extending parallel to said main longitudinal axes in opposite side walls (221) of said frame (202).

* * * * *

UNITED STATES PATENT AND TRADEMARK OFFICE

CERTIFICATE OF CORRECTION

PATENT NO. : 5,328,218

DATED : July 12, 1994

INVENTOR(S) : Enzo BRUSASCO and Giuseppe BOERO

It is certified that error appears in the above-identified patent and that said Letters Patent is hereby corrected as shown below:

On the title page of the patent please change the first inventors address from "Torin" to --Torino--.

On the title page of the patent please change the Foreign Application Priority Data from "52923-9(U) to --52923-B/89.

Signed and Sealed this

Twelfth Day of January, 1999

*Attest:*

*Attesting Officer*

*Acting Commissioner of Patents and Trademarks*